(12) United States Patent
Vallart et al.

(10) Patent No.: US 9,776,708 B2
(45) Date of Patent: Oct. 3, 2017

(54) METHOD OF MANAGING DISCONTINUITIES IN VEHICLE CONTROL FOLLOWING A CONTROL TRANSITION, AND A VEHICLE

(71) Applicant: AIRBUS HELICOPTERS, Marignane (FR)

(72) Inventors: Jean-Baptiste Vallart, Aix en Provence (FR); Romeo Byzery, Marseille (FR)

(73) Assignee: AIRBUS HELICOPTERS, Marignane (FR)

( * ) Notice: Subject to any disclaimer, the term of this patent is extended or adjusted under 35 U.S.C. 154(b) by 78 days.

(21) Appl. No.: 14/963,347

(22) Filed: Dec. 9, 2015

(65) Prior Publication Data

US 2016/0176510 A1    Jun. 23, 2016

(30) Foreign Application Priority Data

Dec. 18, 2014   (FR) ..................................... 14 02912

(51) Int. Cl.
| | |
|---|---|
| *B64C 13/00* | (2006.01) |
| *B64C 13/04* | (2006.01) |
| *B64C 19/00* | (2006.01) |
| *G05D 1/00* | (2006.01) |
| *B60W 50/00* | (2006.01) |

(52) U.S. Cl.
CPC .............. *B64C 13/04* (2013.01); *B64C 13/00* (2013.01); *B64C 19/00* (2013.01); *G05D 1/00* (2013.01); *B60W 50/00* (2013.01); *B60W 50/0098* (2013.01); *B60W 2050/0001* (2013.01); *B60W 2050/0062* (2013.01)

(58) Field of Classification Search
None
See application file for complete search history.

(56) References Cited

U.S. PATENT DOCUMENTS

| | | | |
|---|---|---|---|
| 5,197,697 | A | 3/1993 | Lyloc et al. |
| 6,128,554 | A | 10/2000 | Damotte |
| 8,050,780 | B2 | 11/2011 | Tessier et al. |
| 8,725,321 | B2 | 5/2014 | Hagerott et al. |
| 8,729,848 | B2 | 5/2014 | Scott et al. |
| 2007/0164167 | A1 | 7/2007 | Bachelder et al. |
| 2013/0261853 | A1 | 10/2013 | Shue et al. |

FOREIGN PATENT DOCUMENTS

EP        0718731        6/1996

OTHER PUBLICATIONS

French Search Report for French Application No. 1402912, Completed by the French Patent Office on Oct. 6, 015, 6 Pages.

*Primary Examiner* — Genna Mott
(74) *Attorney, Agent, or Firm* — Brooks Kushman P.C.

(57) ABSTRACT

A method during which a current position of a pilot control is determined, an equivalent position is determined that the pilot control needs to reach following a control transition in order to avoid modifying the actuator, and at least one mismatch is determined between the equivalent position and the current position. As from a transition, a target is determined for controlling the actuator by giving a corrected value to at least one position variable in a post-transition piloting relationship, the corrected value being determined as a function of the mismatch and of the current position of the pilot control. So long as the mismatch is not zero, the value of the mismatch in the relationship is reduced in proportion to the movement of the pilot control as the pilot control comes closer to the equivalent position.

17 Claims, 2 Drawing Sheets

METHOD OF MANAGING DISCONTINUITIES IN VEHICLE CONTROL FOLLOWING A CONTROL TRANSITION, AND A VEHICLE

CROSS REFERENCE TO RELATED APPLICATION

This application claims priority to French patent application No. FR 14 02912 filed on Dec. 18, 2014, the disclosure of which is incorporated in its entirety by reference herein.

BACKGROUND OF THE INVENTION (1) Field of the Invention

The present invention relates to a method of managing discontinuities in the control of a vehicle following a control transition, and also to a vehicle applying the method.

The invention lies more particularly in the field of piloting relationships and more particularly of devices for managing control discontinuities as a result of changing piloting relationships, or of making a change within a single relationship. The invention is particularly advantageous for electrical or optical flight control systems with piloting members having a neutral centered position.

The present invention thus lies in particular in the technical field of electrical or optical controls for controlling the movement of a vehicle, and in particular electrical or optical flight controls for an aircraft.

(2) Description of Related Art

An aircraft usually has control members that can be controlled in order to control the aircraft. The control members may for example comprise airfoil surfaces or indeed members that expel a fluid from the aircraft.

In this context, a rotorcraft has a main rotor that provides the rotorcraft with propulsion and with lift. The pitch of the blades of the main rotor can be adjusted in cyclic or collective manner in order to control the movement of the aircraft in three-dimensional space.

Furthermore, a rotorcraft may have a control member referred to for convenience as an "auxiliary" member for controlling the yaw movement of the rotorcraft. By way of example, such an auxiliary member may either be a tail rotor or else a device that expels fluid sideways.

In order to control such control members, the aircraft may have controls that can be operated by a pilot, where such a control is referred to for convenience as a "pilot control".

Pilot controls are connected in mechanical and/or non-mechanical manner to actuators that move the control members. Non-mechanical pilot controls may comprise electrical or optical controls.

In the context of non-mechanical control, a pilot control may generate a signal that is transmitted to a processor system. Such a processor system may for example comprise a processor unit referred to as a primary flight control system. This processor system then responds to said signal by generating an order with the help of a piloting relationship, the order serving to control at least one actuator that acts directly or indirectly on at least one control member. Such a pilot control may be referred to more simply as an "electrical or optical control".

An electrical or optical control may comprise a joystick, a lever, pedals, . . . .

The electrical or optical signal transmitted by an electrical or optical control may represent the spatial position of the electrical or optical control. The processor unit then inputs this position into a piloting relationship in order to determine the orders to be transmitted to one or more actuators.

Furthermore, an electrical or optical control does not necessarily control a parameter of a control device, such as the pitch of the blades of the main rotor, for example. The electrical or optical control may define a target to be reached by operating the various control members. For example, the electrical or optical control may be operated to specify a speed setpoint to be reached by the aircraft, with the processor system then generating the orders for transmission to the control members in order to reach the setpoint speed.

Thus, the processor unit uses a piloting relationship to generate an order that can be said to be "indirect" insofar as the order is not transmitted directly to an actuator. The indirect order is transmitted to a piloting unit that then generates an order that can be referred to as "direct", the direct order then being transmitted to at least one actuator.

For reasons of vehicle operability, the processor unit may include a plurality of different piloting relationships. The piloting relationships may change, in particular as a function of the stage of flight, or indeed as a function of a piloting mode, e.g. as selected by a pilot.

For example, the processor unit may act during a stage of low speed flight to apply a piloting relationship that generates an indirect order specifying a longitudinal ground speed to be reached. In contrast, during a stage of high speed flight, the processor unit may apply a piloting relationship that generates an indirect order specifying an indicated air speed to be reached.

The transition from one piloting relationship to another piloting relationship can then give rise to discontinuity in control.

Specifically, switching between two piloting relationships may take place automatically in order to reduce the workload on the crew. Furthermore, two distinct relationships do not necessarily produce the same setpoint for the actuators for a given position of an electrical control.

Consequently, a pilot may position an electrical or optical control in a given position. In this position a first piloting relationship generates at least one first order that is transmitted to at least one control member. Unfortunately, the two relationships do not necessarily produce the same order for the same position of the electrical or optical control.

Thus, when the electrical control is in this given position, the second relationship may generate at least one second order that is different from the first order. A sudden switch from the first relationship to the second relationship can then produce a jolt on the control that is referred to as a "control discontinuity", or more simply as a "discontinuity". This discontinuity is harmful not only for the path followed by the vehicle, but also for the comfort of the crew and passengers, if any, and indeed for the mechanical strength of the controlled control members.

Switching between two piloting relationships is not the only source of discontinuity. Certain pilot actions can also give rise to discontinuities.

For example, a joystick may be moved about a neutral position in which the joystick gives a reference order. A pilot has the option of modifying this reference order. Thus, the pilot may move the joystick into a deflected position representing a desired new reference order. Then using a selector knob, the pilot can specify that the order being transmitted by the joystick corresponds henceforth to the reference order to be supplied when the joystick is in its neutral position.

However, the joystick is still in its deflected position, and that leads to a discontinuity.

To solve that problem, instead of performing the operation of modifying the reference of the joystick by tilting the joystick, it can be performed by using an interface that is dedicated to that operation. The pilot then modifies the reference order with the help of the interface while keeping the joystick in the neutral position in order to avoid a discontinuity.

The problem of discontinuities also covers transitions between different computers in a given architecture, e.g. in the result of a failure, or indeed transitions between two distinct piloting modes, e.g. in the event of a failure of a primary sensor.

Below, the term "control transition" is used to refer to a transition between two piloting relationships, or indeed to a transition between two references of a pilot control. Consequently, a control transition is any transition that might generate a discontinuity in the controls of a vehicle.

Several solutions exist for limiting the impact of a control discontinuity.

A first solution consists in spreading out the passage from one piloting relationship to another piloting relationship, e.g. by limiting the speed of execution of an order generated by the piloting relationship. This limitation does indeed serve to limit the effect of a discontinuity.

In the above example, passing from the first order that results from applying a first piloting relationship to a second order that results by way of example from applying a second piloting relationship takes place progressively at a speed that is limited. That first solution serves to reduce jolts that result from the discontinuity by slowing down the transition between two successive control orders that are different.

Nevertheless, that first solution tends to limit the speed of execution for any orders that are given, even in the absence of a discontinuity. The person skilled in the art thus needs to find a compromise between the dynamic behavior of the piloting relationship and the hardness of the jolt that is suffered as a result of switching between two piloting relationships.

If the person skilled in the art seeks to have discontinuities that are very well smoothed, then speed limitations are set to match control speeds that are very slow, thereby penalizing the responsiveness of the piloting relationship. Conversely, if the responsiveness of the piloting relationship is preferred, then the speed limitations are adjusted to control speeds that are fast, thereby limiting the effect of discontinuity smoothing.

A second solution consists in using a software component referred to as a "fader".

Unlike the first solution, this component applies a speed limitation only on a difference between orders coming from two different piloting relationships at the time of switching between those two piloting relationships.

The second solution makes it possible to avoid one of the drawbacks of the first solution. Specifically, in the absence of switching, the second solution does not act at all on the piloting relationship that is being implemented.

Like the first solution, the second solution makes it possible to spread out the switchover between two piloting relationships. If the spreading time is short, then the switchover can generate a jolt in the control. In contrast, if the time is too long, then control over the aircraft can be degraded.

A third solution consists in establishing a transition piloting relationship over a transition range. For example, in a speed range, a transition piloting relationship results from linear interpolation between two piloting relationships as a function of a speed of the aircraft.

Throughout the transition range, the pilot is nevertheless without control over a real physical magnitude. Pilotability in the transition relationship is thus degraded. In order to minimize that drawback, the transition range is minimized, thereby correspondingly limiting the benefits expected from such a method.

A fourth solution consists in causing two different relationships to converge on similar control orders in order to limit the control discontinuity, and thus limit its impact on board the vehicle. Although effective, the behavior of the aircraft at the time of transition can be difficult to assess.

The technological background includes the following documents: U.S. Pat. Nos. 8,729,848; 5,197,697; 8,050,780; and 8,725,321.

Document U.S. Pat. No. 8,729,848 describes a joystick co-operating with a passive force feedback system.

Document U.S. Pat. No. 5,197,697 describes a system enabling a pilot to operate a control in order to modify a control order of an autopilot system.

Document U.S. Pat. No. 8,050,780 describes a force feedback system for a control stick. A position signal and a force signal are used in a force feedback loop in order to control a motor that is mechanically connected to the stick.

Document U.S. Pat. No. 8,725,321 describes a pilot control that is mechanically connected to a segment of a control member. Furthermore, a force sensor measures the force exerted by a pilot on the pilot control. The force sensor sends a force signal to a processor unit that controls an actuator connected to another segment of the control member specifically as a function of said force signal.

Documents EP 0 718 731, US 2013/261853, and US 2007/164167 are also known.

Document EP 0 718 731 describes a device for actuating a controlled member of an aircraft. That device includes a computer connected to actuator means suitable for actuating a controlled member as a function of the action of a pilot on a control member.

BRIEF SUMMARY OF THE INVENTION

An object of the present invention is to propose a method tending to avoid discontinuities in a control following a control transition, which transition may be the result of passing from one piloting relationship to another piloting relationship or indeed as a result of a modification to a reference of a control member.

The invention thus relates to a method of controlling an actuator acting on a control member of a vehicle, the actuator being controlled by a human-operable pilot control in application of a plurality of piloting relationships, each piloting relationship determining a target to be reached for controlling the actuator as a function of at least one position variable relating to a position of said pilot control relative to a neutral position.

The method comprises the following steps:
determining a current position of the pilot control, the actuator being controlled by giving the current position to said at least one position variable of a first piloting relationship;
determining an equivalent position that the pilot control needs to reach after a control transition in order to avoid modifying the actuator;
determining at least one mismatch between the equivalent position and the current position;
determining the presence of said control transition;
from the control transition, determining a target for controlling the actuator by applying a post-transition piloting relationship, the target being determined by giving a corrected value to at least one said position variable in said post-transition piloting relationship, the corrected value being determined as a function of the mismatch and of the current position of the pilot control;

determining a movement of said pilot control; and so long as said mismatch is not zero, reducing said mismatch in proportion to said movement when said pilot control is moved towards said equivalent position.

The term "giving the current position to said at least one position variable of a first piloting relationship" means that the current position is identified by at least one position parameter, and the value of this position parameter is given to the position variable of the first piloting relationship. For example, a pivot angle of the pilot control is measured, with this angle being input into the first piloting relationship.

A mismatch then represents a difference between two distinct values for a pilot parameter.

Furthermore, an actuator may include a structural portion that can be stretched, retracted, deflected, or indeed pivoted, for example. The term "in order to avoid modifying the actuator" means that the actuator remains in a given shape, and said portion is then not stretched, retracted, deflected, or pivoted, for example.

The invention thus proposes handling a control discontinuity as a function of the action of a pilot on a pilot control, and not as a function of a timing criterion.

The pilot control may be any member for piloting a vehicle. For example, a pilot control may be a set of pedals, a stick for controlling the cyclic pitch of a rotorcraft, a lever for controlling the collective pitch of a rotorcraft, an engine throttle, a joystick for controlling a rudder, or a joystick for controlling ailerons on an airplane.

The pilot control may be moved by a pilot in order to set a target in application of a piloting relationship.

For example, the pedals may control a position variable of a piloting relationship.

Furthermore, a joystick can be moved within a volume that is conical. The position of the joystick in the conical volume may be determined using two position parameters. Such a joystick may then control two position variables, e.g. for two respective distinct piloting relationships or both for a single piloting relationship. In particular, this current position may be determined by identifying two angles relative to two pivot axes.

Consequently, in this method, the current position of the pilot control is determined. This current position of a pilot control serves to control one or more position variables of a first piloting relationship. The first piloting relationship then generates a target for controlling at least one actuator acting on a control member.

This target is transmitted directly to each actuator in question, or indirectly via a piloting unit that determines the order to be transmitted to each actuator in order to reach the target.

Specifically, in a variant, the target is an order transmitted to an actuator. Optionally, the order may nevertheless pass via a piloting unit, while nevertheless not being modified by the piloting unit.

Nevertheless, in another variant, the target is transmitted to a piloting unit, the piloting unit applying at least one piloting relationship in order to transform the target into at least one control signal transmitted to an actuator.

In parallel, an equivalent position to be reached after a control transition is determined.

It should be recalled that a control transition leads to a modification to the target that is transmitted to an actuator in the absence of movement of a pilot control. For example, a joystick held stationary in a given position generates two different targets respectively before the transition and as from the transition. It is shown below that the control transition can be caused by changing the piloting relationship that is applied or indeed by modifying the value of a reference variable of a piloting relationship.

Consequently, the method proposes generating said "equivalent position" of the pilot control that, at the time of the control transition, will give a target that has no influence on the controlled actuator. In other words, the current position before the control transition and the equivalent position following the control transition cause the same order to be generated for transmission to at least one actuator.

Under such circumstances, at least one mismatch is determined between the current position and the equivalent position.

For example, a joystick may be used to adjust the values of two position variables. Two mismatches relating respectively to each of the two position variables may then optionally be determined.

In the method, the operation of the vehicle is continuously monitored in order to determine whether a control transition is about to occur. The term "determining the presence of said control transition" is used to mean a step that consists in determining whether a transition is to occur. If so, the transition is performed in application of the described method.

Under such circumstances, and still if a transition is to occur, at the time of the control transition, each mismatch is used in addition to the corresponding position variable in order to determine a corrected value that is injected into the appropriate piloting relationship.

Thus, the pilot control is in a current position adjusting at least one position variable. The value of this position variable is corrected by using the previously-determined mismatch.

For example, at least one mismatch is equal to a difference between said equivalent position and said current position. The corrected value is then equal to the sum of said current position of said pilot control plus said mismatch.

Alternatively, at least one mismatch is equal to a difference between said equivalent position and said current position, said corrected value being equal to the difference of said current position of said pilot control minus said mismatch.

At transition, the pilot control thus causes a setpoint to be created for transmission to an actuator that is equal to the setpoint that was being transmitted prior to the transition. This method thus makes it possible to avoid a control discontinuity.

For example, a tilt angle of the pilot control is measured. Each piloting relationship determines a setpoint for transmission to an actuator as a function of this angle. For example, in accordance with a first piloting relationship the setpoint is then equal to the product of said angle multiplied by a first constant.

A control transition may lead to a second piloting relationship being applied for which the setpoint is equal to the product of said angle multiplied by a second constant.

At each calculation instant, an angle mismatch is determined so that the setpoint is identical in application both of the first piloting relationship and in application of the second piloting relationship.

Nevertheless, only one piloting relationship is active at any one instant for controlling an actuator.

Thus, prior to the control transition, only the first piloting relationship is used for controlling an actuator, with the angle input into the first piloting relationship corresponding to the current angle of the pilot control.

In contrast, at the time of control transition, only the second piloting relationship is used for controlling the actuator, with the angle that is input into the second piloting relationship then corresponding to the sum of the current pilot control angle plus said mismatch.

This mismatch is nevertheless eliminated progressively thereafter as a function of the action of the pilot on the pilot control. So long as the pilot does not move the pilot control, then neither the current pilot nor the mismatch changes, which means that the order given to at least one actuator remains constant.

If the pilot moves the pilot control away from the equivalent position, then the second piloting relationship interprets the change in setpoint normally and modifies the order given to at least one actuator. The mismatch is not modified.

If the pilot moves the pilot control towards the equivalent position, then the mismatch is reduced in proportion and the order given to at least one actuator remains unchanged.

The pilot control moving towards the equivalent position can be determined by conventional methods. For example, the sum of the value of a parameter representing the current position plus the value of the same parameter for the theoretical position is monitored. If this sum decreases by a certain quantity, then the pilot control is moving towards the equivalent position. Under such circumstances, the mismatch may for example be reduced by the same amount.

This method is not obvious in any way, in particular because of this procedure. So long as the mismatch is not zero, the pilot control moving towards an equivalent position has no effect on the actuators and thus no effect on the behavior of the vehicle.

This characteristic may appear to be surprising. Nevertheless, the Applicant has found that the piloting relationships, the mismatches, and the amplitudes of pilot control movements are such that this non-linear operation of the pilot control can be of little consequence for a pilot in comparison with the advantages made available by the invention, and indeed the pilot may have little perception of this non-linearity. In particular, the differences between control sensitivities among the various types of relationship relative to a given axis are reasonable.

Likewise, the theoretical position may be relatively close to control abutments which might be disconcerting for a pilot. However, the piloting relationships, the mismatches, and the amplitudes of pilot control movements are such that this operation can be of little consequence for a pilot. A manufacturer can in particular establish the piloting relationships and the conditions in which they are applied so as to avoid an equivalent position lying outside the operating range of an actuator, for example.

Thus, by going against prejudices, the invention proposes a method that tends to optimize control transitions while a human is operating a pilot control.

In particular, the vehicle applies only one piloting relationship at any one time, and does not apply a possible hybrid relationship that might be difficult to control.

Furthermore, establishing a mismatch between a current position and an equivalent position tends to enable a pilot to situate accurately the current position of the pilot control in the context of the piloting relationship that is applied after the transition.

Furthermore, the invention makes it possible to use conventional modes of operation during a stage of piloting that is fully automatic, in which there is no crew action on the pilot control.

The method may also include one or more of the following additional characteristics.

In a first implementation, the control transition corresponds to the transition between the first piloting relationship and a second piloting relationship, the first piloting relationship being applied before the control transition, the second piloting relationship being the post-transition piloting relationship that is applied as from the control transition.

In this first implementation, the vehicle may implement a plurality of piloting relationships. Consequently, a control transition occurs on passing from one piloting relationship to another piloting relationship.

For example, the vehicle is an aircraft and the presence of a control transition may be determined by determining a current flight stage of the aircraft, the first piloting relationship being applied during a first flight stage, and the second piloting relationship being applied during a second flight stage that is distinct from the first flight stage.

A manufacturer can determine a plurality of distinct flight stages, with each flight stage being associated with at least one piloting relationship.

In particular, the term "flight stage" may also cover stages in which a vehicle is moving on the ground. By way of non-limiting example, flight stages may include at least one flight stage that occurs when at least one portion of landing gear is in contact with the ground, and at least one flight stage may occur when the landing gear is not in contact with the ground. In particular, the flight stages may include a flight stage off the ground while hovering, a flight stage off the ground at low speed, and a flight stage off the ground at high speed.

These various flight stages may be identified using at least one force sensor arranged on landing gear and at least one means for measuring the forward speed of an aircraft.

It is also possible to determine a control transition by monitoring a selector unit that serves to determine the piloting relationship that is to be applied.

For example, the vehicle may include a knob, a voice control, a touch control, or the equivalent, to enable a pilot to select the piloting relationship that is to be applied.

In order to determine the equivalent position of a pilot control, the theoretical position is determined that is to be reached by said pilot control in order to transmit a target in application of said second piloting relationship that is identical to a target generated in application of said first piloting relationship when said pilot control is in said current position.

In a first alternative of the first implementation, the first piloting relationship and said second piloting relationship generate a target relating to the same parameter, and in order to determine said equivalent position the following steps are performed:

determining a current target by applying said current position to at least one position variable of said first piloting relationship; and determining a theoretical position to be reached by said pilot control in order to generate said current target when applying said theoretical position to at least one position variable of said second piloting relationship, said equivalent position being equal to said theoretical position.

Under such circumstances, during a first stage, the first piloting relationship is applied while inputting thereto the value of at least one position variable, the value of this position variable being determined by the current position of the pilot control. The first piloting relationship then generates a current target that is used for controlling at least one actuator.

During a second stage, the second piloting relationship is applied while inputting thereto said current target. The second piloting relationship then makes it possible to determine a theoretical position for the pilot control that would enable said current target to be reached.

In a second alternative of the first implementation, each piloting relationship is a function of at least one position variable and of at least one reference variable corresponding to said neutral position, said first piloting relationship generating a first target relating to a first parameter and said second piloting relationship generating a second target relating to a second parameter different from said first parameter, and in order to determine said equivalent position the following steps are performed:

determining the second value of the second parameter to be reached at the moment of said control transition, referred to as the "corresponding" value; and giving said corresponding value to said reference variable, the neutral position representing said equivalent position.

For example, the first piloting relationship determines a ground speed target, while the second piloting relationship determines an air speed target known as the "indicated air speed". Switchover logic based amongst other things on the ground speed and the air speed of the vehicle then organizes switching between the two piloting relationships.

Before the transition from one relationship to the other, the equivalent references are calculated.

For example, before the transition from the first piloting relationship involving ground speed to the second piloting relationship involving indicated air speed, a "corresponding" value is determined for the second parameter, namely the current indicated air speed.

The corresponding value can be measured, calculated, or estimated. Optionally, and as in the above example, the corresponding value may be estimated by summing the reference ground speed before the transition and an estimate of the wind speed along the longitudinal axis of the vehicle.

This corresponding value is then given to the neutral position of the pilot control for application of the second piloting relationship. Thereafter, if the pilot control is not moved, application of the second piloting relationship leads to an indicated air speed target being generated, which target reaches the corresponding value.

This neutral position also represents the equivalent position from which a mismatch from the current position is determined.

In a third alternative of the first implementation, each piloting relationship is a function of at least one position variable and of at least one reference variable corresponding to said neutral position, said first piloting relationship generating a first target relating to a first parameter and said second piloting relationship generating a second target relating to a second parameter different from said first parameter, and in order to determine said equivalent position the following steps are performed:

determining the second value of the second parameter to be reached at the moment of said control transition, referred to as the "corresponding" value;

weighting the corresponding value in order to determine a weighted value weighted with a given weighting factor, the weighted value being equal to the product of the corresponding value multiplied by the weighting factor; and determining said equivalent position that the pilot control is to reach after the control transition in order to avoid generating a discontinuity by giving said reference variable said weighted value in said second piloting relationship, and then determining a mismatch between the equivalent position and the current position.

At the time of transition, the second piloting relationship is applied by giving the reference variable the weighted value, and by giving a corrected value to the position variable, said corrected value being determined as a function of said mismatch and of said current position of said pilot control.

A second implementation consists in applying the method during a change of reference of a pilot control.

Thus, the pilot control is in a neutral position in the absence of a human exerting any force on the pilot control, said first piloting relationship being a function of at least one position variable and of a reference variable corresponding to said neutral position, said post-transition piloting relationship being said first piloting relationship, said control transition corresponding to a transition between a reference value referred to as the "first" reference value and a reference value referred to as a "second" reference value for the reference variable.

In addition, the pilot control is in a neutral position in the absence of a human exerting force on the pilot control, said first piloting relationship is a function of at least one position variable and of at least one reference variable corresponding to said neutral position, and said equivalent position is said neutral position.

For example, a pilot moves a joystick and uses a knob to indicate that the order transmitted by the joystick must henceforth correspond to the order that is to be transmitted in the neutral position of the joystick.

The method of the invention tends to avoid a discontinuity in this situation.

For example, it is also possible to determine said control transition by monitoring an adjustment unit that adjusts said reference variable.

Thus, a joystick may for example control said first piloting relationship implementing a first reference value for the reference variable. A pilot tilts the joystick and specifies that the resulting target represents a second reference value for the reference variable.

The first piloting relationship is then modified so as to give this second reference value to the reference variable.

Furthermore, a mismatch between the current position that generated the second reference value and the neutral position is also determined. Thereafter, the first piloting relationship is used while inputting thereto not the value of the parameter controlled by the joystick, but a corrected value that depends on said value and on said mismatch.

In addition to a method, the invention also provides a vehicle that applies the method.

According to the invention, a vehicle is provided with at least one control member, said vehicle including at least one actuator acting on said control member, said vehicle having at least one pilot control for controlling an actuator in order to act on said control member.

The vehicle comprises:

at least one sensor for measuring the position of said pilot control relative to a neutral position;

a processor unit connected to each sensor, the processor unit having a memory storing a plurality of piloting relationships, each piloting relationship determining a target to be reached for controlling said actuator as a function of at least one position variable relating to a position of said pilot control relative to a neutral position, and a reference variable, if any, the processor unit having a computer for determining said target in application of the of the invention.

Furthermore, the vehicle may include a piloting unit connected to the processor unit and to said actuator, the piloting unit including a computer subassembly for applying said method.

BRIEF DESCRIPTION OF THE SEVERAL VIEWS OF THE DRAWINGS

The invention and its advantages appear in greater detail in the context of the following description of examples given by way of illustration and with reference to the accompanying figures, in which.

DETAILED DESCRIPTION OF THE INVENTION

Elements present in more than one of the figures are given the same references in each of them.

Figure 1:
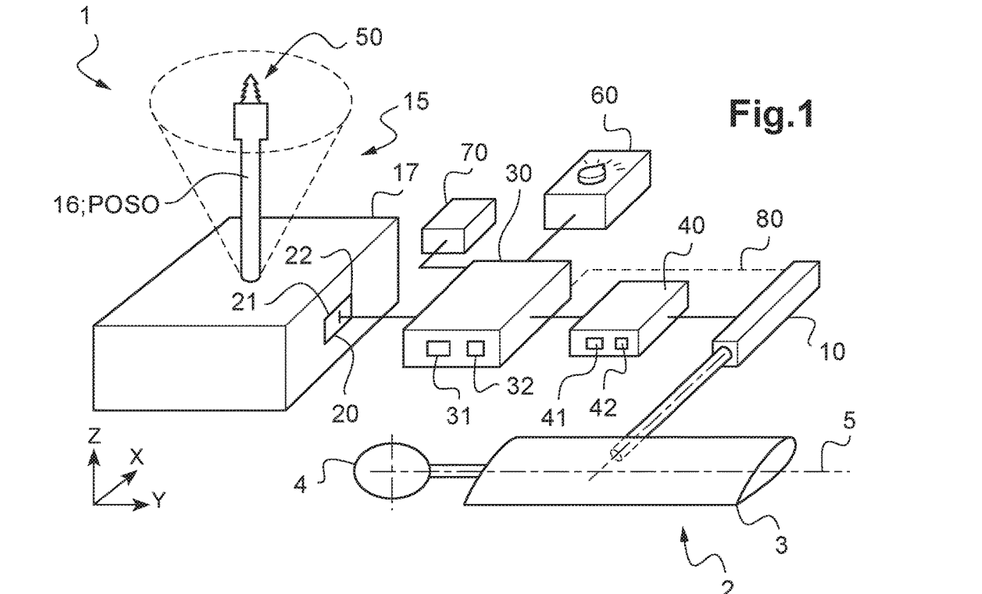
FIG. 1 is a diagrammatic view of a vehicle of the invention, and in particular of a rotorcraft type aircraft.

FIG. 1 shows a vehicle 1 of the invention.

The vehicle 1 has at least one control member 2 used for controlling the vehicle.

In the example of FIG. 1, the vehicle 1 is a rotorcraft having at least one control member 2 of the blade 3 type. This blade 3 can pivot about at least one pivot axis 5 relative to a hub 4 or the equivalent.

Nevertheless, the control member may comprise in nonexhaustive manner: a wheel, an aileron, a rudder, a flap.

In order to move the control member, the vehicle has at least one actuator 10. In the example of FIG. 1, the actuator is a servo-control connected to a pitch control rod of a blade. By way of example, a set of conventional swashplates may be interposed between the servo-control and the blade. Reference may be made to the literature in order to obtain information about the control members of a rotorcraft and the associated actuators.

Nevertheless, any type of actuator could be used, such as a piezoelectric actuator or a rotary actuator, for example.

At least one actuator can be controlled by a pilot.

Consequently, the vehicle has at least one pilot control 15 suitable for generating a control order that is transmitted to an actuator.

The pilot control may control at least one actuator by mechanically transmitting an order to a processor unit 30. Nevertheless, the pilot control may transmit a signal that is electrical or optical, e.g. for the purpose of controlling at least one control member. Under such circumstances, the pilot control has at least one sensor 20 for determining the spatial position of the pilot control relative to a neutral reference position POS0.

In the example of FIG. 1, the pilot control 15 is in its neutral reference position POS0.

This pilot control 15 may comprise a stick 16 carried by a support 17. The stick extends in elevation along an elevation axis Z. In addition, the stick 16 may be moved in a volume that is conical. Consequently, the stick 16 is movable in pivoting about a longitudinal axis X and a transverse axis Y.

Figures 2, 3:
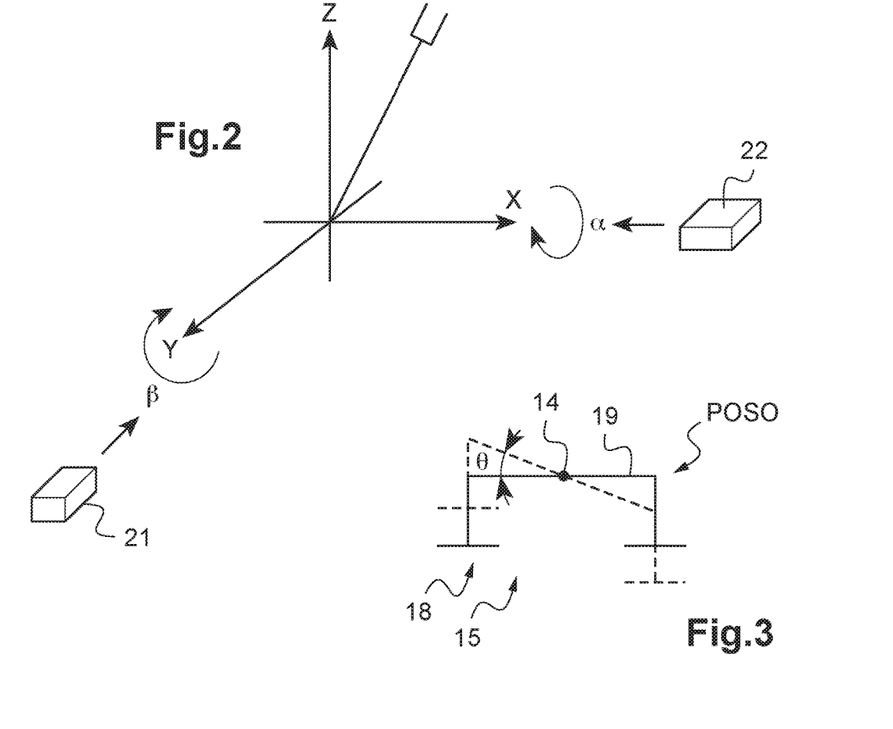
FIGS. 2 and 3 are diagrams explaining how to determine the current position of a pilot control.

Consequently, and with reference to FIG. 2, a first conventional movement sensor 21 may determine the position of the stick 16 relative to the transverse axis Y, by measuring a pivot angle $\beta$.

Likewise, a second conventional movement sensor 22 may determine the position of the stick 16 relative to the longitudinal axis X, by measuring a pivot angle $\alpha$.

In the example of FIG. 3, the pilot control 15 may be a set of pedals 18. By way of example, the set of pedals 18 includes a bar 19 that is pivotable about a pivot axis 14. The pilot control then comprises, by way of example, a sensor for measuring the pivot angle $\theta$ of the bar relative to its neutral position that is drawn in continuous lines.

This pilot control thus transmits at least one signal to a processor unit 30.

The processor unit 30 is also connected to each sensor 20 for determining the current position of the pilot control. More precisely, the processor unit 30 is connected to each sensor directly, or indirectly via an intermediate unit. The processor unit may be of conventional type known as a primary flight control system.

Furthermore, the processor unit includes a memory 31 serving in particular to store piloting relationships that are to be applied in order to generate a target. The memory 31 may comprise one or more storage units.

Each stored piloting relationship determines a target as a function of at least one variable that is referred to as a "position" variable, the value of the position variable being determined by the spatial position of the pilot control.

Furthermore, at least one piloting relationship may include a reference variable having a reference value that corresponds to the value that the position variable needs to reach when the pilot control is in its neutral position. By way of example and by way of illustration, a first piloting relationship may have the following form:

$$Obj = C1*(V1+V0)+C2$$

where "Obj" represents the target or "objective" as determined by the piloting relationship, "C1" and "C2" are constants, "V1" represents the position variable adjusted as a function of the position of the pilot control, "V0" represents the reference variable, "*" represents the multiplication sign, and "+" represents the addition sign.

When the pilot control is in the neutral position, V1 is then equal to zero.

The reference value of the reference variable V0 may also be modified by using an adjustment unit 50 that is connected to the processor unit 30. For example, this adjustment unit includes a button arranged on the corresponding pilot control. Nevertheless, it is possible to use any means that may be operated by touch, by voice, or by eye.

This piloting relationship is given by way of illustration.

In order to determine the target to be reached, the processor unit 30 includes a computer 32 that executes instructions stored in the memory 31. In particular, the computer determines the piloting relationship that is required, and inputs into this required piloting relationship the values of each of the position variables representing the current position of the pilot control.

Such a computer may be a conventional computer. For example, the computer may comprise a processor, a microprocessor, a microcontroller, or indeed a logic circuit.

In order to determine the required piloting relationship, the processor unit 30 may be connected to measurement instruments 70 of the vehicle. Such measurement instruments 70 may comprise conventional measurement means for measuring at least one speed of the vehicle, measurement means for measuring at least one force exerted on at least one part of landing gear, . . . . In particular, the measurement instruments 70 may include air speed measuring means (of the Pitot tube type, laser anemometer, . . . ), satellite positioning means (absolute position, ground speed), inertial measurement means for measuring the dynamic behavior of the vehicle (angular speeds, load factor).

The processor unit 30 may also be connected to a selector unit 60 suitable for determining the piloting relationship to be applied. For example, the selector unit may comprise a rotary knob. Nevertheless, it is possible to use any means operated by touch, by voice, or indeed by eye.

The target determined by a piloting relationship serves to control an actuator 10 in order to control the vehicle. This target may be a control signal that can be used directly by an actuator 10. Under such circumstances, the processor unit is connected directly to the actuator via a connection 80 shown in dashed lines.

Nevertheless, the target may be of a kind that cannot be used by an actuator. For example, the target may be a ground speed value to be reached. In order to reach this ground speed, several control members may need to be moved by a plurality of actuators.

Under such circumstances, the processor unit is connected to a piloting unit 40 that is interposed between the actuators 10 and the processor unit 30. The processor unit 30 and the piloting unit 40 may possibly comprise the same unit within a single piece of equipment.

The piloting unit 40 may include a memory 41 and a computer subassembly 42. The computer subassembly 42 then executes instructions that may for example be stored in the memory 41 for the purpose of determining setpoints to be transmitted to at least one actuator 10 in order to reach the target transmitted by the processor unit. For example, the memory contains relationships providing setpoints for transmitting to said actuators as a function of the received target.

Figure 4:
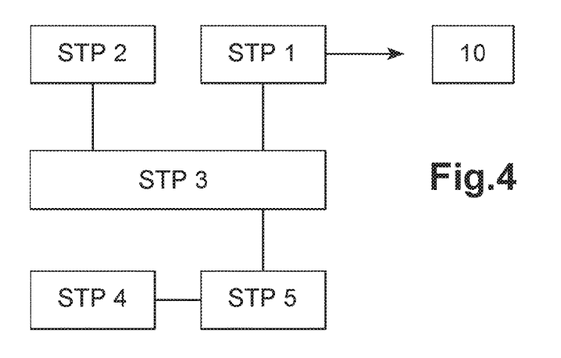
FIG. 4 is a logic diagram explaining the method of the invention.

FIG. 4 explains the method implemented by the invention.

During a first step STP1, the current position of a pilot control is transmitted to the processor unit, with at least one actuator being controlled by giving the value of at least one parameter representing said current position to at least one position variable of a first piloting relationship.

Returning to the above example, the first piloting relationship is of the form:

$$Obj = C1*(V1+V0)+C2$$

A sensor acts, by way of example, to measure the pivoting of a portion of a pilot control about an axis relative to its neutral position. The processor unit receives a signal representing the measured angle. The processor unit then gives the measured angle value to the position variable V1 in order to determine the target Obj to be reached.

The target Obj is then transmitted directly or indirectly to at least one actuator 10.

In parallel, during a second step STP2, an equivalent position of the pilot control is determined, e.g. by determining the value of each position variable representing said equivalent position in the piloting relationship in question. This equivalent position represents the theoretical position that the pilot control 15 needs to reach as a result of a control transition in order to avoid requesting action from the actuators 10 at the moment of control transition.

The processor unit then determines the piloting relationship to be applied at the moment of a future control transition. This piloting relationship is referred to as the "post-transition" positioning relationship.

By way of example, a control transition may lead to a second piloting relationship being applied having the form:

$$Obj = C1'*(V1'+V0')+C2'$$

where "Obj" represents the target determined by the second piloting relationship, "C1'" and "C2'" represent constants, "V1'" represents the position variable adjusted as a function of the position of the pilot control, "V0'" represents said reference variable, "*" represents the multiplication sign, and "+" represents the addition sign.

In this example, the first piloting relationship and the second piloting relationship generate the same target Obj.

By way of illustration, the first piloting relationship and the second piloting relationship generate a pitching attitude target for the aircraft, the value of this target nevertheless being calculated in application of two different relationships. For example, the first piloting relationship generates a pitching attitude for taking account of a setpoint ground speed, while the second piloting relationship generates a pitching setpoint target for maintaining a setpoint air speed.

The processor unit then determines the position variable value V1' that is to be reached in order to avoid modifying the target. This position variable value V1' represents the equivalent position that needs to be reached by the pilot control in order to avoid leading to a modification of the actuators at the moment of transition.

During a step STP3, at least one mismatch between said equivalent position and said current position is determined. For example, a mismatch is determined for each position variable representing the position of a pilot control in a piloting relationship under consideration.

In a first alternative, a mismatch is equal to a difference between the equivalent position and the current position. For example, the mismatch is equal to a difference between the value of a position variable representing the equivalent position and the value of the same position variable representing the current position, i.e. V1'−V1 in the above example.

In a second alternative, a mismatch is equal to a difference between the current position and the equivalent position. For example, the mismatch is equal to a difference between the value of a position variable representing the current position and the value of the same position variable representing the equivalent position, i.e. V1−V1' in the above example.

During a fourth step STP4, equipment of the vehicle determines whether a control transition is to be applied.

A control transition may take place when the first piloting relationship needs to be replaced by a second piloting relationship.

This change in the piloting relationship that is to be applied may be requested by a pilot operating the selector unit 60. Thus, a transition may be implemented as a result of the selector unit 60 being operated.

In another possibility that is applicable to an aircraft, the piloting relationships are associated with stages of flight. For example, one piloting relationship is applied during one stage of flight, and another piloting relationship is applied during another stage of flight.

Under such circumstances, the processor unit uses the measurement instruments 70 to determine the current stage of flight and the piloting relationship that is to be applied.

A control transition may also occur by modifying the reference value of a reference variable representing a pilot control in its neutral position.

The processor unit thus monitors the adjustment unit 50 in order to determine whether a pilot is requesting such a modification.

Consequently, the processor unit is in communication with numerous members for determining the presence of a control transition, i.e. the presence of events that ought to induce the control transition.

If a control transition is requested, the target in use for controlling at least one actuator is determined by applying a piloting relationship referred to as the "post-transition" piloting relationship.

Depending on the situation, the post-transition piloting relationship may be a second piloting relationship that is distinct from the previously-used first piloting relationship, or it may be the previously-used first piloting relationship but with at least one reference variable that has been changed.

Nevertheless, each position value input into the post-transition piloting relationship is corrected as a function of the corresponding mismatch. The corrected value input into the post-transition piloting relationship is thus determined as a function of a mismatch and of the current position of the pilot control.

In a first preceding alternative, the corrected value of a position variable is equal to the sum of the value of the position variable representing the current position of the pilot control plus the corresponding mismatch.

In a second preceding alternative, the corrected value of a position variable is equal to the difference of the value of the position variable representing the current position of the pilot control minus the corresponding mismatch.

In addition, the processor unit uses conventional methods to determine whether a pilot moves the pilot, for example it may use a summing method.

If the pilot brings the pilot control towards the equivalent position, and so long as said mismatch is not zero, then the processor unit reduces the value of this mismatch in proportion with the movement of the pilot control.

The position variable is no longer corrected when the mismatch becomes zero.

Figure 5:
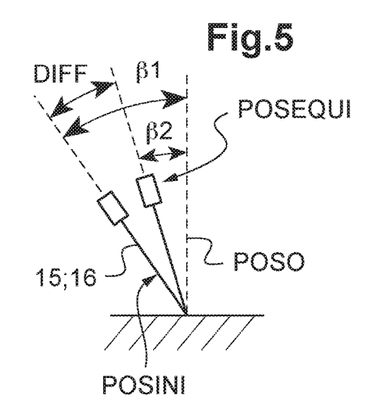
FIGS. 5 and 6 are diagrams showing two variants of a first implementation.
Figure 6:
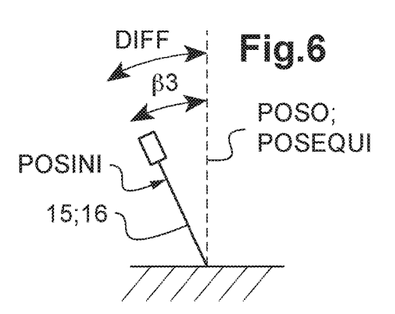

FIGS. 5 and 6 show two variants of a first implementation. In order to illustrate the invention, consideration is given to a first piloting relationship applied before the transition that has the simple form as described above, i.e.:

$$Obj=C1*(V1+V0)+C2$$

In FIG. 5, the processor unit manages a control transition from a first piloting relationship to a second piloting relationship, both relationships providing a target relating to the same parameter, said first piloting relationship being applied before said control transition and said second piloting relationship being said post-transition piloting relationship that is applied as from the transition. The second piloting relationship may then for example have the following form:

$$Obj=C1'*(V1'+V0')+C2'$$

Before the transition, the pilot control is in a first position POSINI. The target is then determined by giving the value of the pivot angle $\beta 1$ to the position variable V1.

Furthermore, the processor unit determines the equivalent position POSEQUI by determining that the position variable V1' of the second piloting relationship needs to reach a pivot angle of value $\beta 2$ in order to enable the first piloting relationship and the second piloting relationship to generate the same target.

The processor unit deduces therefrom a mismatch DIFF between the current position and the theoretical position.

When the transition from the first piloting relationship to the second piloting relationship is requested, the processor unit implements the second piloting relationship.

The processor unit then gives a corrected value to the position variable V1' of the second piloting relationship.

Thus, depending on the alternative being applied, the processor unit considers that the value of the position variable V1' is equal:

to the sum of the current value $\beta 1$ of the position variable plus the mismatch DIFF, i.e.:

$$V1'=\beta 1+DIFF=\beta 2$$

or to the difference between the current value $\beta 1$ of the position variable minus the mismatch DIFF, i.e.:

$$V1'=\beta 1-DIFF=\beta 2$$

In addition, the value of the mismatch DIFF decreases when the pilot control comes closer to the equivalent position POSEQUI. For example, if the pilot control is tilted through an angle of 2° towards the equivalent position, the mismatch DIFF is indeed reduced by this angle of 2°.

In FIG. 6, the processor unit manages a control transition from a first piloting relationship to a second piloting relationship, each supplying respective targets, one relating to a first parameter and the other to a second parameter, which parameters are different.

By way of example, the second piloting relationship may then have the following form:

$$Obj'=C1'*(V1'+V0')+C2'$$

Before the transition, the pilot control is in the first position POSINI. The target Obj is then determined by giving the value of the angle $\beta 3$ to the position variable V1 in the first piloting relationship. For example, this target relates to a first parameter concerning ground speed.

The second piloting relationship may then for example have the following form:

$$Obj'=C1'*(V1'+V0')+C2'$$

The target Obj' determined by the second piloting relationship may then for example be a target relating to indicated air speed.

In the method of the invention, the current value is determined for the second parameter that is referred to as the "corresponding" value, i.e. for the current indicated air speed in this example. By way of example, the processor unit may make use of the measurement instruments 70 in order to determine this current value of the second parameter involved in the second piloting relationship. Alternatively, the corresponding value may be estimated.

The processor unit then gives the corresponding value to the reference variable V0' of the second piloting relationship, said neutral position representing said equivalent position.

Furthermore, the processor unit considers that the equivalent position POSEQUI for the pilot control is the neutral position POS0.

The processor unit deduces therefrom a mismatch DIFF between the current position and the theoretical position.

When the transition from the first piloting relationship to the second piloting relationship is requested, the processor unit implements the second piloting relationship.

The processor unit then applies a corrected value to the position variable V1' of the second piloting relationship.

Thus, depending on the alternative being applied, the processor unit considers that the position variable V1' is equal:

to the sum of the current value $\beta3$ of the position variable plus the mismatch DIFF, i.e.:

$$V1'=\beta3+\text{DIFF}$$

or to the difference of the current value $\beta3$ of the position variable minus the mismatch DIFF, i.e.:

$$V1'=\beta3-\text{DIFF}$$

In addition, the value DIFF of the mismatch decreases as the pilot control comes closer to the equivalent position POSEQUI.

Figure 7:
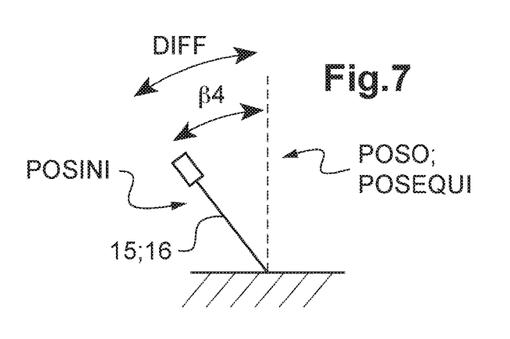
FIG. 7 is a diagram showing a second implementation.

In FIG. 7, the processor unit manages a control transition resulting from modifying the reference value of a reference variable of the first piloting relationship. The first piloting relationship then uses a reference variable that is equal to a first reference value before the transition, and that is equal to a second reference value after the transition.

Before the transition, the pilot control is in the first position POSINI. The target Obj is then determined by giving the value of the angle $\beta4$ to the position variable V1 in the first piloting relationship, and by giving a first reference value V11 to the reference variable V1. Under such circumstances, the target Obj is determined by the following relationship:

$$Obj=C1*(\beta4+V11)+C2$$

The target Obj' determined by the second piloting relationship may for example be an indicated air speed target.

By way of example, the pilot operates the adjustment unit 50 in order to indicate that the target reached referred to as the "reference" target needs to be the target when the pilot control is in the neutral position.

Under such circumstances, the processor unit determines the second reference value V12 that is to be reached by the reference variable when the pilot control is in its zero position. In the example described, this second reference value is then equal to:

$$V12=(Obj-C2)/C1$$

Furthermore, the processor unit considers that the equivalent position POSEQUI of the pilot control is the neutral position POS0. The processor unit deduces therefrom a mismatch DIFF between the current position and the theoretical position.

After the transition, the processor unit modifies the first piloting relationship by giving the second reference value V12 to the reference variable, i.e.:

$$Obj=C1*(V1+V12)+C2$$

The processor unit then gives the corrected value to the position variable V1 of the second piloting relationship.

Furthermore, depending on the alternative that is being applied, the processor unit considers that the position variable V1 is equal:

to the sum of the current value $\beta4$ of the position variable plus the mismatch DIFF, i.e.:

$$V1=\beta4+\text{DIFF}$$

or to the difference of the current value $\beta3$ of the position variable minus the mismatch DIFF, i.e.:

$$V1=\beta4-\text{DIFF}$$

In addition, the mismatch value DIFF decreases as the pilot control comes closer to the equivalent position POSEQUI.

Naturally, the present invention may be subjected to numerous variants as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of controlling an actuator acting on a control member of a vehicle, the actuator being controlled by a human-operable pilot control in application of a plurality of piloting relationships, each piloting relationship determining a target to be reached for controlling the actuator as a function of at least one position variable relating to a position of the pilot control relative to a neutral position, wherein the method comprises the following steps:

determining a current position of the pilot control, the actuator being controlled by giving the current position to the at least one position variable of a first piloting relationship;

determining an equivalent position that the pilot control needs to reach after a control transition in order to avoid modifying the actuator;

determining at least one mismatch between the equivalent position and the current position;

determining the presence of the control transition;

from the control transition, determining a target for controlling the actuator by applying a post-transition piloting relationship, the target being determined by giving a corrected value to at least one position variable in the post-transition piloting relationship, the corrected value being determined as a function of the mismatch and of the current position of the pilot control;

determining a movement of the pilot control; and so long as the mismatch is not zero, reducing the mismatch in proportion to the movement when the pilot control is moved towards the equivalent position.

2. A method according to claim 1, wherein the control transition corresponds to the transition between the first piloting relationship and a second piloting relationship, the first piloting relationship being applied before the control transition, the second piloting relationship being the post-transition piloting relationship that is applied as from the control transition.

3. A method according to claim 2, wherein the vehicle is an aircraft and the presence of a control transition is determined by determining a current flight stage of the aircraft, the first piloting relationship being applied during a first flight stage, and the second piloting relationship being applied during a second flight stage that is distinct from the first flight stage.

4. A method according to claim 2, wherein the control transition is determined by monitoring a selector unit that serves to determine the piloting relationship that is to be applied.

5. A method according to claim 2, wherein in order to determine the equivalent position, a theoretical position is determined that is to be reached by the pilot control in order to transmit a target in application of the second piloting relationship that is identical to a target generated in application of the first piloting relationship when the pilot control is in the current position.

6. A method according to claim 5, wherein the first piloting relationship and the second piloting relationship generate a target relating to the same parameter, and in order to determine the equivalent position the following steps are performed:

determining the current target by applying the current position to at least one position variable of the first piloting relationship; and determining the theoretical position to be reached by the pilot control in order to generate the current target when applying the theoretical position to at least one position variable of the second piloting relationship, the equivalent position being equal to the theoretical position.

7. A method according to claim 5, wherein each piloting relationship is a function of at least one position variable and of at least one reference variable corresponding to the neutral position, the first piloting relationship generating a first target relating to a first parameter and the second piloting relationship generating a second target relating to a second parameter different from the first parameter, and in order to determine the equivalent position the following steps are performed:

determining a second value of the second parameter to be reached at the moment of the control transition, referred to as the "corresponding" value; and giving the corresponding value to the reference variable, the neutral position representing the equivalent position.

8. A method according to claim 5, wherein each piloting relationship is a function of at least one position variable and of at least one reference variable corresponding to the neutral position, the first piloting relationship generating a first target relating to a first parameter and the second piloting relationship generating a second target relating to a second parameter different from the first parameter, and in order to determine the equivalent position the following steps are performed:

determining a second value of the second parameter to be reached at the moment of the control transition, referred to as the "corresponding" value;

weighting the corresponding value in order to determine a weighted value with a given weighting factor, the weighted value being equal to the product of the corresponding value multiplied by the weighting factor; and determining the equivalent position by giving the reference variable the weighted value in the second piloting relationship.

9. A method according to claim 1, wherein the pilot control is in a neutral position in the absence of a human exerting any force on the pilot control, the first piloting relationship being a function of at least one position variable and of a reference variable corresponding to the neutral position, the post-transition piloting relationship being the first piloting relationship, the control transition corresponding to a transition between a reference value referred to as a "first" reference value and a reference value referred to as a "second" reference value for the reference variable.

10. A method according to claim 9, wherein the control transition is determined by monitoring an adjustment unit that adjusts the reference variable.

11. A method according to claim 9, wherein the pilot control is in the neutral position in the absence of a human exerting force on the pilot control, the first piloting relationship is a function of at least one position variable and of at least one reference variable corresponding to the neutral position, and the equivalent position is the neutral position.

12. A method according to claim 1, wherein the target is an order transmitted to the actuator.

13. A method according to claim 1, wherein the target is transmitted to a piloting unit, the piloting unit applying at least one piloting relationship in order to transform the target into at least one control signal transmitted to the actuator.

14. A method according to claim 1, wherein at least one mismatch is equal to a difference between the equivalent position and the current position, the corrected value being equal to the sum of the current position of the pilot control plus the mismatch.

15. A method according to claim 1, wherein at least one mismatch is equal to a difference between the equivalent position and the current position, the corrected value being equal to the difference of the current position of the pilot control minus the mismatch.

16. A vehicle provided with at least one control member, the vehicle including at least one actuator acting on the control member, the vehicle having at least one pilot control for controlling an actuator in order to act on the control member, wherein the vehicle comprises:

at least one sensor for measuring the position of the pilot control relative to a neutral position;

a processor unit connected to each sensor, the processor unit having a memory storing a plurality of piloting relationships, each piloting relationship determining a target to be reached for controlling the actuator as a function of at least one position variable relating to a position of the pilot control relative to the neutral position, the processor unit having a computer for determining the target in application of the method according to claim 1.

17. A vehicle according to claim 16, wherein the vehicle includes a piloting unit connected to the processor unit and to the actuator, the piloting unit including the computer wherein the target is transmitted to the piloting unit, the piloting unit applying at least one piloting relationship in order to transform the target into at least one control signal transmitted to the actuator.

* * * * *